Patented Jan. 3, 1933

1,893,331

UNITED STATES PATENT OFFICE

WALTHER KANGRO AND AGNES LINDNER, OF BRUNSWICK, GERMANY

PROCESS OF SEPARATING BERYLLIUM COMPOUNDS FROM BERYLLIUM CONTAINING MINERALS OR OTHER SUBSTANCES

No Drawing. Application filed July 23, 1930, Serial No. 470,224, and in Germany July 30, 1929.

The invention relates to a process of separating beryllium compounds from beryllium containing minerals or other substances by means of chlorination.

The object of our invention is to simplify the process and to carry it through in such a manner that the material of the furnace is not endangered and so that the process may be carried through under fixed or constant conditions and in continuous operation.

According to our invention the chlorination is carried through by means of chlorine or gases containing chlorine, and more particularly in a current or stream of these chlorine-like gases, the temperature and the pressure of these gases being so adjusted that the substances present in the reaction chamber have the tendency to form a mixture in a state of chemical equilibrium or balance in which besides chlorine there exist mainly volatile beryllium-chlorine compounds and oxygen or oxygen containing gases and the substance containing solid beryllium.

According to a preferred embodiment of our invention the beryllium chlorine compounds and the oxygen or the oxygen-containing gases are continuously discharged from the reaction chamber as soon as a state tending towards a balanced mixture has become stationary or constant or substantially stationary or constant.

According to another preferred embodiment of our invention the chlorine-like gases are passed by a pressure gradient through the process.

We wish it to be understood that wherever in this specification and the claims the term chlorine-like gases is used this term is intended to cover chlorine or gases which contain chlorine in mechanical mixture or in chemical combination, and likewise that the term oxygen-like gases is intended to cover oxygen or gases which contain oxygen in mixture or in combination.

The chemical principles underlying our improved process will be understood from the following novel chemical conversions:

It has been ascertained that pure chlorine gas at high temperatures, preferably above 1000° C., acts in such a manner on beryllium compounds, particularly the oxides, silicates, aluminates, alumino-silicates and other compounds of beryllium, that volatile beryllium-chlorine compounds are formed, mainly chlorides, perhaps also oxychlorides, and free oxygen. Chemically balanced conditions are set up which at lower temperatures are such that in the balanced mixture there exist mainly beryllium oxide and chlorine besides very minute quantities of beryllium chloride and oxygen. With rising temperature the ratio of the substances in relation to one another alters in such a way that steadily increasing quantities of beryllium chloride, oxygen and chlorine above solid beryllium oxide are stable side by side in the balanced mixture.

If two constituents of this mixture, viz. beryllium chloride and oxygen are continuously removed from this balanced mixture the entire solid oxide of beryllium, even if combined with aluminium oxide, silicon dioxide or other compounds, is gradually converted into volatile chlorine compounds. The conversion into beryllium-chlorine compounds may be accelerated either by working at a reduced total pressure, or with an overpressure of chlorine. Conversely, an addition of oxygen to the balanced mixture brings about a displacement in so far as beryllium oxide and free chlorine is again formed from the beryllium chloride.

Our improved process is carried out in the following manner:

Beryllium mineral or the substances containing beryllium such as waste from previous finishing or manufacturing processes, or beryllium alloys are, preferably in the dry state, heated to comparatively high temperatures, preferably more than 1000° in a shaft furnace constructed of clay, alumina, quartz-sand or any other ceramic material which is refractory and indifferent to chlorine gas, and then exposed to the action of a stream of chlorine gas or gases containing chlorine. The then developed volatile beryllium compounds, mainly chloride or also oxychlorides of beryllium are discharged from the furnace by the stream of chlorine, or chlorine containing gas, and pass into a suitably cooled chamber in which they deposit in solid form and in a substantially pure state. The chlorine or the chlorine containing gases are preferably used in excess over the beryllium chloride forming. The gases may also be employed under increased pressure. The aggregate pressure of all the gases existing in the reaction chamber amounting in the substantially stationary, or equilibrium state, for instance, to less than one atmosphere.

The velocity of flow of the chlorine or chlorine containing gas may vary within wide limits. Preferably it is not kept too low since a higher speed permits of a reduction of the working temperature and the working time. The same result is attained if the material to be roasted in the furnace, is reduced in size or disinegrated prior to subjecting it to the roasting process. The beryllium-chlorine compounds so produced, as far as they are not used as such, are dissolved in water. A very considerable amount of heat is developed therewith which may be utilized for drying the minerals or the compounds produced or for other heating purposes. The aqueous solution of beryllium chloride may on the one hand be worked with sodium chloride into beryllium sodium chloride, suitable as fused electrolytes or electrolysis in the fused state. On the other hand beryllium hydroxide and beryllium oxide respectively may be obtained from the solution by precipitation with lye. The chloride produced in this way is preferably regenerated electrolytically into lye and free chlorine which are both again introduced into the process.

Another embodiment of our invention leads directly to the pure beryllium oxide by a dry process. This process consists in blowing oxygen into the hot gases escaping from the roasting furnace which consists essentially of chlorine, beryllium-chlorine compounds and some oxygen or oxygen containing gases, through a nozzle of ceramic material located conveniently in the gas stream. The solid beryllium oxide then separates from the equilibrium mixture in the purest state, the quantity of chlorine which had been combined with the beryllium being set free again. From the remaining mixture of chlorine and oxygen or oxygen-like gases the chlorine is recovered by known methods and again applied to the roasting process.

In order to obtain as complete a conversion as possible into beryllium oxide the oxygen or oxygen-like gases are preferably raised to such a temperature that the entire gas mixture is not cooled down too suddenly but remains for some time at temperatures near the boiling point of beryllium chloride, for instance at 400 to 800°, i. e. at such temperatures at which, as already pointed out, reconversion of the beryllium chlorine compounds into beryllium oxide takes place. A slowing down of the cooling is also effected by the considerable quantity of heat which is set free during the conversion into beryllium oxide. The quantity of oxygen supplied must be so proportioned that it at least neutralize the action of the chlorine which is present in excess at the beginning. Preferably the process is carried out with an excess of oxygen, more particularly with oxygen of increased pressure. It is, furthermore, advantageous to give the stream of oxygen a direction opposite to the stream of the chlorine gas so that the volume of gas escaping from the furnace at a relatively high velocity are subjected to a braking action. In this way the gases are caused to remain a little longer in a chamber of medium temperature while, on the other hand, the beryllium oxide precipitated in a very fine granular state is not carried along too far and atomized.

Instead of oxygen, air or any other gas mixture containing oxygen may be employed in this modification of our process.

The heating of the reaction material may be effected in any suitable manner, for instance by means of a heating chamber appropriately fitted in the reaction chamber but closed towards it in a gas tight manner, or in customary manner from outside. Another manner of heating consists in applying the heat to the reaction material by means of hot gases which sweep over the material. Gases may then be used which are inert or neutral to the reaction product, or the reaction gas, the chlorine, itself. The heating of the chlorine gas or of the heating gas necessary for this purpose, may take place in various ways, either by means of a flame, the chlorine gas then flowing through externally heated tubes of clay or a refractory material, or by electrical means, in which case the chlorine gas is subjected to preheating in resistance bodies of carbon, such as carbon tubes, carbon grids, carbon granules and so on or in the electric arc flame.

The beryllium compounds obtained by the chlorinating roasting are directly obtained in a perfectly pure state, provided that in the raw materials there are contained no substances which enter into volatile combinations with the chlorine at the temperatures employed. If, on the other hand such foreign substances are contained in the raw materials, it is necessary to isolate them from the beryllium if their presence is undesirable for the further use of the beryllium compounds. Iron oxide is the most frequently occurring contamination of this kind in the mineral, less frequently magnesium oxide. The iron may easily be separated from the beryllium by reason of the fact that iron oxide is quantitatively converted by chlorine into the volatile iron chloride at far lower temperatures, say 800 to 900°, and carried off. It is therefore advisable to subject beryllium minerals or substances, which contain iron, at low temperatures, for instance 800° to 1000°, to a chlorinating preroasting process and to collect the chloride of iron formed thereby separately. Beryllium does not pass over as yet. Only after all the iron has been removed from the raw material the temperature is raised up to the point necessary for the formation of chloride of beryllium. An analogous separation or isolation by fractional volatilization may be carried through with all those admixtures of the raw or initial material which combine with chlorine to chlorine compounds at other temperatures than the beryllium. For this purpose we next pass in the reaction chamber containing the raw material a chlorine-like stream of gas over the material containing the beryllium and for the purpose of removing foreign metal constituents first adjust the temperature and the pressure in the reaction chamber in such a manner that the substances contained in the reaction chamber tend towards a mixture in chemical equilibrium in which besides the chlorine there exists mainly chlorine compounds of those metals, then discharge those compounds and then adjust the temperature and the pressure in the reaction chamber in such a manner that the substances contained in the reaction chamber tend towards a fresh mixture in chemical equilibrium in which besides chlorine there exist mainly volatile beryllium-chlorine compounds, oxygen-like gases and the material. In this way the admixtures may on their part be recovered in the pure state. The beryllium may also be separated from magnesium since the magnesium chloride, which is volatilized together with the beryllium chloride, goes into solution when dissolved in water and remains quantitatively behind within the solution when the beryllium hydroxide is precipitated.

The chlorine gas employed in our process need not be perfectly dry. It has been ascertained that minute quantities of moisture do not retard the conversion into beryllium chlorides. Excessive quantities of water, such as occur in moist minerals, on the other hand, retard the conversion or reaction.

Under some conditions hydrogen chloride gas may be admixed with the chlorine. The action on the beryllium compounds then takes place in a manner quite analogous to that of the free chlorine with the difference only that some aqueous vapour is formed instead of the free oxygen. These gases will therefore preferably be used in cases where moist minerals are to be dealt with or such which contain chemically combined water. Gases which contain combined chlorine, such as hydrogen or sulphur monochloride or carbon tetrachloride and others or mixtures of these or any of them with chlorine may be employed with advantage upon such raw materials containing beryllium which would require such a relatively high temperature for treatment as to produce decomposition of the raw materials.

All minerals or substances containing beryllium are suitable as raw materials for our improved process. If beryllium alloys are to be employed in the process it may be advisable to convert the metals of these alloys first into oxides and then to separate the mixture of the oxides according to our improved process.

The process is also suitable for the separation or isolation of the beryllium from such substances in which the presence of beryllium is undesirable.

What is claimed is:

1. The process of separating beryllium compounds from ores, minerals or substances which contain beryllium, which consists in passing a chlorine-like stream of gas over the material containing the beryllium in a reaction chamber, and adjusting the temperature and the pressure in the reaction chamber in such a manner that the substances contained therein tend to attain a mixture in chemical equilibrium, in which besides chlorine there exist mainly volatile beryllium-chlorine compounds, oxygenating gases and the material.

2. The process of separating beryllium compounds from ores, minerals or substances which contain beryllium, which consists in passing a chlorine-like stream of gas over the material containing the beryllium in a reaction chamber, adjusting the temperature and the pressure in the reaction chamber in such a manner that the substances contained therein tend to attain a mixture in chemical equilibrium, in which besides chlorine there exist mainly volatile beryllium-chlorine compounds, oxygenating gases and the material, and continuously discharging the beryllium compounds and the oxygenating gases as soon as the state tending to bring about a mixture in equilibrium has become substantially stationary in the reaction chamber.

3. The process of separating beryllium compounds from ores, minerals or substances which contain beryllium, which consists in passing a chlorine-like stream of gas under a pressure drop or gradient over the material containing beryllium in a reaction chamber, adjusting the temperature and the pressure in said chamber in such a manner that the substances contained therein tend to attain a mixture in chemical equilibrium, wherein besides chlorine there exists mainly volatile beryllium-chlorine compounds, oxygenating gases and the material, and continuously discharging the beryllium compounds and the oxygenating gases as soon as the state tending to bring about a mixture in equilibrium has become substantially determined in said chamber.

4. The process of separating beryllium compounds from ores, minerals or substances which contain beryllium, which consists in passing a chlorine-like stream of gas at increased pressure under a pressure drop or gradient over the material containing the beryllium in a reaction chamber, adjusting the temperature and the pressure in the reaction chamber in such a manner that the substances contained in the reaction chamber tend to attain a mixture in chemical equilibrium, in which besides chlorine there exist mainly volatile beryllium-chlorine compounds, oxygenating gases and the material, and continuously discharging the beryllium compounds and the oxygenating gases as soon as the state tending to bring about a mixture in equilibrium has become substantially determined in the reaction chamber.

5. The process of separating beryllium compounds from ores, minerals or substances which contain beryllium, which consists in passing a chlorine-like stream of gas over the material containing the beryllium in a reaction chamber, adjusting the temperature and the pressure in said chamber in such a manner that the substances contained in the reaction chamber tend to attain a mixture in chemical equilibrium, in which besides chlorine there exist mainly volatile beryllium-chlorine compounds, oxygenating gases and the material, and continuously discharging the beryllium compounds and the oxygenating gases as soon as the state tending to bring about a mixture in equilibrium has become substantially determined in the reaction chamber, the aggregate pressure of all the gases existing in the reaction chamber amounting in this substantially stationary state to less than one atmosphere.

6. The process of separating beryllium compounds from ores, minerals or substances which contain beryllium, which consists in passing a chlorine-like stream of gas over the material containing the beryllium in a reaction chamber, adjusting the temperature and the pressure in said chamber in such a manner that the substances contained therein tend to attain a mixture in chemical equilibrium, in which besides chlorine there exists mainly volatile beryllium-chlorine compounds, oxygenating gases and the material, and continuously discharging the beryllium compounds and the oxygenating gases as soon as the state tending to bring about a mixture in equilibrium has become substantially determined in the reaction chamber, whereupon the beryllium compounds discharged from the process are dissolved in water and the heat of solution is usefully employed in the process.

7. The process of separating beryllium compounds from ores, minerals or substances which contain beryllium, which consists in passing a chlorine-like stream of gas under a pressure drop or gradient over the material containing the beryllium in a reaction chamber, adjusting the temperature and the pressure in said chamber in such a manner that the substance contained in the reaction chamber tends to attain a mixture in chemical equilibrium, in which besides chlorine there exists mainly volatile beryllium-chlorine compounds, oxygenating gases and the material, and continuously discharging the beryllium compounds, the oxygenating gases and the excess of chlorine as soon as the state tending to bring about a mixture in equilibrium has become substantially stationary in the reaction chamber, whereupon additional oxygenating gases are admixed with the constituents discharged from the process, viz. chlorine, beryllium-chlorine compounds and the oxygenating gases containing some oxygen, in such a manner that beryllium-oxygen compounds separate therefrom.

8. The process of separating beryllium compounds from ores, minerals or substances which contain beryllium, which consists in passing a chlorine-like stream of gas under a pressure drop or gradient over the material containing the beryllium in a reaction chamber, adjusting the temperature and the pressure in the reaction chamber in such a manner that the substances contained therein tend to attain a mixture in chemical equilibrium, in which besides chlorine there exists mainly volatile beryllium-chlorine compounds, oxygenating gases and the material, and continuously discharging the beryllium compounds, and the oxygenating gases as soon as the state tending to bring about a mixture in equilibrium in the reaction chamber has become substantially stationary, whereupon additional oxygenating gases at increased pressure are admixed with the constituents discharged from the process, viz. chlorine, beryllium-chlorine compounds and the oxygenating gases containing some oxygen, in such a manner that the beryllium-oxygen compounds separate therefrom.

9. The process of separating beryllium compounds from ores, minerals, or substances which contain beryllium, which consists in passing a chlorine-like stream of gas under a pressure drop or gradient over the material containing the beryllium in a reaction chamber, adjusting the temperature and the pressure in the reaction chamber in such a manner that the substances contained therein tend to attain a mixture in chemical equilibrium, in which besides chlorine there exists mainly volatile beryllium-chlorine compounds, oxygenating gases and the material, and continuously discharging the beryllium compounds, the oxygenating gases and the excess of chlorine as soon as the state tending to bring about a mixture of equilibrium in the reaction chamber has become substantially stationary, whereupon additional oxygenating gases at increased pressure are admixed in counter-flow with the constituents discharged upon the process, viz. chlorine, beryllium-chlorine compounds and the oxygenating gases containing some oxygen, in such a manner that the beryllium-oxygen compounds separate therefrom.

10. The process of separating beryllium compounds from ores, minerals or substances which contain beryllium, which consists in passing a chlorine-like stream of gas under a pressure drop or gradient over the material containing the beryllium in a reaction chamber, adjusting the temperature and the pressure in the reaction chamber in such a manner that the substances contained therein tend to attain a mixture in chemical equilibrium, in which besides chlorine there exists mainly volatile beryllium-chlorine compounds, oxygenating gases and the material, continuously discharging the beryllium compounds, the oxygenating gases and the excess of chlorine as soon as the state tending to bring about a mixture in equilibrium in the reaction chamber has become substantially stationary, whereupon additional oxygenating gases at a temperature in the vicinity or between 400–800° C. are admixed with the constituents discharged from the process, viz. chlorine, beryllium-chlorine compounds and the oxygenating gases containing some oxygen.

11. The process of separating beryllium compounds from ores, minerals or substances which contain beryllium, which consists in passing a chlorine-like stream of gas under a pressure drop or gradient over the material containing the beryllium in a reaction chamber, adjusting the temperature and the pressure in the reaction chamber in such a manner that the substances contained therein tend to attain a mixture in chemical equilibrium, in which besides chlorine there exists mainly volatile beryllium-chlorine compounds, oxygenating gases and the material, continuously discharging the beryllium compounds, the oxygenating gases and the excess of chlorine as soon as the state tending to bring about a mixture in chemical equilibrium in the reaction chamber has become substantially stationary, the discharged chlorine being again introduced into the working cycle of the process.

12. The process of separating beryllium compounds from ores, minerals or substances which contain beryllium, which consists in passing a chlorine-like stream of gas over the material containing the beryllium in a reaction chamber, and for the purpose of removing foreign metal constituents first adjusting the temperature and the pressure in the reaction chamber in such a manner that the substances contained in the reaction chamber tend towards a mixture in chemical equilibrium in which besides the chlorine there exist mainly chlorine compounds of said foreign metals, discharging said compounds and then adjusting the temperature and the pressure in the reaction chamber in such a manner that the substances contained therein tend towards a fresh mixture in chemical equilibrium in which besides chlorine there exists mainly volatile beryllium-chlorine compounds, oxygenating gases and the material.

13. The process of separating beryllium compounds from ores, minerals or substances which contain beryllium, which consists in passing a chlorine-like stream of gas over the material containing the beryllium in a reaction chamber and for the purpose of removing foreign metal constituents first at a temperature in the vicinity of or between 800–1000° C. adjusting the pressure in the reaction chamber in such a manner that the substances contained therein tend towards a mixture in chemical equilibrium in which besides the chlorine there exist mainly chlorine compounds of said foreign metals, discharging said compounds, and then adjusting the temperature and the pressure in the reaction chamber in such a manner that the substances contained in the reaction chamber tend towards a fresh mixture in chemical equilibrium in which besides chlorine there exists mainly volatile beryllium-chlorine compounds, oxygenating gases and the material.

In testimony whereof we affix our signatures.

WALTHER KANGRO.
AGNES LINDNER.

CERTIFICATE OF CORRECTION.

Patent No. 1,893,331.  January 3, 1933.

WALTHER KANGRO, ET AL.

It is hereby certified that error appears in the printed specification of the above numbered patent requiring correction as follows: Page 2, line 69, for "neutralize" read "neutralizes", and line 76, for "volume" read "volumes"; page 3, line 63, after the syllable "drogen" insert the word "chloride"; and that the said Letters Patent should be read with these corrections therein that the same may conform to the record of the case in the Patent Office.

Signed and sealed this 21st day of February, A. D. 1933.

(Seal)

M. J. Moore,
Acting Commissioner of Patents.